(12) United States Patent
Kelly et al.

(10) Patent No.: US 9,176,278 B2
(45) Date of Patent: Nov. 3, 2015

(54) GENERATING BROADBAND SPECTRAL POWER IN MULTIMODE OPTICAL FIBERS

(75) Inventors: David P. Kelly, Nashua, NH (US); Peter A. Ketteridge, Amherst, NH (US); Daniel J. Creeden, Nashua, NH (US); Benjamin R. Johnson, Nottingham, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 134 days.

(21) Appl. No.: 13/994,429

(22) PCT Filed: Aug. 22, 2012

(86) PCT No.: PCT/US2012/051775
§ 371 (c)(1),
(2), (4) Date: Sep. 25, 2013

(87) PCT Pub. No.: WO2013/028710
PCT Pub. Date: Feb. 28, 2013

(65) Prior Publication Data
US 2014/0010497 A1    Jan. 9, 2014

Related U.S. Application Data

(60) Provisional application No. 61/527,166, filed on Aug. 25, 2011.

(51) Int. Cl.
*G02B 6/26* (2006.01)
*G02B 6/42* (2006.01)
(Continued)

(52) U.S. Cl.
CPC ............... *G02B 6/268* (2013.01); *G02F 1/383* (2013.01); *H01S 3/302* (2013.01); *G02B 6/14* (2013.01); *G02F 2001/3528* (2013.01); *H01S 3/06704* (2013.01); *H01S 3/102* (2013.01)

(58) Field of Classification Search
CPC .... G02B 6/14; G02B 6/1228; G02B 6/12007; G02B 6/2813; G02B 6/02095; G02B 6/208; G02F 1/383; H01S 3/302

USPC .......................................................... 385/28
See application file for complete search history.

(56) References Cited

U.S. PATENT DOCUMENTS 4,375,680 A    3/1983  Cahill et al.
6,496,264 B1   12/2002 Goldner et al.
(Continued)

FOREIGN PATENT DOCUMENTS

JP    2005524880    8/2005

OTHER PUBLICATIONS

PCT/US2012/051775 International Search Report mailed Feb. 28, 2013.

*Primary Examiner* — Jerry Blevins
(74) *Attorney, Agent, or Firm* — Joseph E. Funk; Daniel J. Long

(57) ABSTRACT

A broadband spectral power generator in a multimode optical fiber utilizes a standard multimode fiber that is coiled. A plate is placed on the coiled fiber and a force is applied to compresses the coiled fiber and thereby increase the interactions between the compressed windings and induce modal mixing and birefringence in the fiber. In addition, the compression causes additional non-linear processes to be excited and occur in the compressed fiber coil to generate more broadband light. This allows for better "mixing" of the spatial beam in the multimode fiber coil and allows for the various modes to overlap. The multimode fiber coil is made of silica, silicate, germinate, phosphate, fluoride, chalcogenide, or telluride. The compressed coiled fiber may be driven by a laser providing more than one wavelength output and this greatly increases the amount of nonlinear mixing in the fiber for a greatly enhanced spectral coverage.

20 Claims, 2 Drawing Sheets

(51) Int. Cl.
  *H01S 3/30* (2006.01)
  *G02F 1/383* (2006.01)
  *H01S 3/067* (2006.01)
  *H01S 3/102* (2006.01)
  *G02B 6/14* (2006.01)
  *G02F 1/35* (2006.01)

(56) References Cited

U.S. PATENT DOCUMENTS

2002/0191928 A1* 12/2002 Carter et al. ................. 385/127
2007/0160092 A1   7/2007 Okuno
2011/0176140 A1   7/2011 Blin et al.

* cited by examiner

GENERATING BROADBAND SPECTRAL POWER IN MULTIMODE OPTICAL FIBERS

RELATED APPLICATION

This application claims the benefit of U.S. Provisional Application 61/527,166 filed Aug. 25 2011, which is incorporated herein in its entirety by reference

STATEMENT OF GOVERNMENT INTEREST

The invention was made with United States Government assistance under contract no. W911W6-08-C-0004, awarded by the US Department of the Army. The United States Government has certain rights in the invention.

FIELD OF THE INVENTION

The present invention relates to optical fibers, and more specifically to generating broadband output with multimode optical fibers.

BACKGROUND OF THE INVENTION

In optics, a supercontinuum is formed when a collection of nonlinear processes act together upon a pump beam in order to cause severe spectral broadening of the original pump beam into a smooth spectral continuum. There is no definitive explanation of how much spectral broadening constitutes a supercontinuum.

A supercontinuum source typically consists of a pulsed laser and a non-linear element, in which a combination of non-linear effects in the non-linear element broadens the narrow-band, pulsed laser radiation into a continuous spectrum without destroying the spatial coherence of the laser light. Photonic crystal fibers are uniquely suited as the nonlinear medium for such supercontinuum sources, offering high non-linearity, suitable dispersion characteristics and ease of use.

Examples of photonic crystal fibers used to create supercontinuum sources are available, from NKT Photonics in Denmark, Fianium in the UK, and Leukos France.

These nonlinear photonic optical fibers are generally engineered to have particular dispersion and nonlinear characteristics based on specific wavelengths of interest. These nonlinear fibers also typically have very small core diameters (<5 micron diameter). The reason for such small diameter cores is to increase the optical intensity in the optical fiber. The smaller the core diameter is, the higher the optical intensity in the fiber, and the lower the nonlinear thresholds are in that fiber for a given length. Thus, it is easier to generate a supercontinuum using a shorter length optical fiber.

An alternative to using a nonlinear optical fiber with a small diameter core is to use one with a larger diameter core and increase the length of the optical fiber. However, using nonlinear optical fibers having long lengths usually leads to greater optical propagation losses, so using optical fibers having small diameter cores helps to maintain a short length of optical fiber to minimize losses and maximize output power.

The main problem with small diameter optical fibers is that it is very difficult to free-space couple a laser beam into an end of the optical fiber and hold the beam thereon efficiently. The tolerances associated with coupling a laser beam into an end of these small diameter optical fibers are very tight, and any slight misalignments can lead to a loss of coupling between the two, or to damage of the optical fiber. If a laser-optical fiber system is required to handle even moderate temperature excursions, this laser beam to optical fiber coupling becomes more difficult and very expensive to overcome.

Using fiber optic cables having larger core diameters offers easier optical coupling between a laser source and an end of the cable with looser tolerances. However, optical fibers having larger diameter cores increases nonlinear thresholds and decreases optical intensity in the fibers. To overcome the decrease in optical intensity the length of the optical fiber must be increased. However, the increase in length of the optical fiber often leads to more propagation losses. In addition, use of optical fibers having larger diameter cores usually results in multimode operation of the optical fiber, which also has an effect on nonlinear thresholds.

Thus, a need therefore exists in the art for an inexpensive, broadband, supercontinuum generator that utilizes standard, larger diameter optical fibers, rather than specialized nonlinear optical fibers having small core diameters.

SUMMARY OF THE INVENTION

The aforementioned need in the prior art is satisfied by the teaching of the present invention. Rather than utilizing a special, small core diameter optical fiber to create a supercontinuum generator source a standard, larger core diameter multimode fiber is utilized. This larger core diameter multimode fiber may have a diameter of in the order of 15 microns and a length of 250 meters so avoids the mounting and other problems detailed in the Background of the Invention. To achieve the results, formerly only available with small diameter optical fibers the long, larger diameter, multimode optical fiber is coiled around a typical fiber spool and is then compressed in a direction parallel to the axis of the spool. The result of the compression is that there are interactions between the coils of the multimode optical fiber that produce the same broadband supercontinuum output as if a small diameter, multimode optical fiber was used.

DESCRIPTION OF THE DRAWING

The invention will better understood upon reading the following Detailed Description in conjunction with the drawing in which.

DETAILED DESCRIPTION

Figure 1:
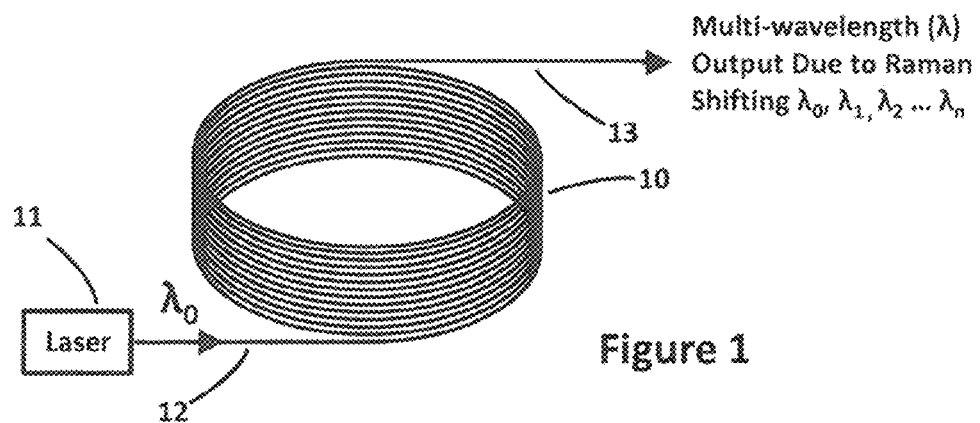
FIG. 1 shows a laser coupled into a standard coil of multimode optical fiber to produce a multi-wavelength output due to Raman shifting.

FIG. 1 shows a prior art, larger core diameter, coiled, multimode optical fiber 10 pumped at one end 12 by a pulsed laser 11 in manner well known in the art to produce multiple wavelengths $\lambda$ at its output 13 due to Raman shifting. An example of the multimode output from the prior art, larger diameter, multimode optical fiber is shown in and described with reference to FIG. 4. The coupling between the output of pulsed laser 11 and end 12 of optical fiber 10 is typically free-space and utilizes a lens (not shown) to focus the pulsed laser beam from laser 11 onto end 12. This form of coupling is well known in the art. As shown in FIG. 1 there some artistic liberties taken. Space is shown between the windings of optical fiber 10 which is not really there.

This larger core diameter, multimode fiber 10 may have a diameter of in the order of 15 microns and a length of 250 meters and avoids the mounting and other problems detailed in the Background of the Invention for smaller core diameter optical fibers.

Figure 4:
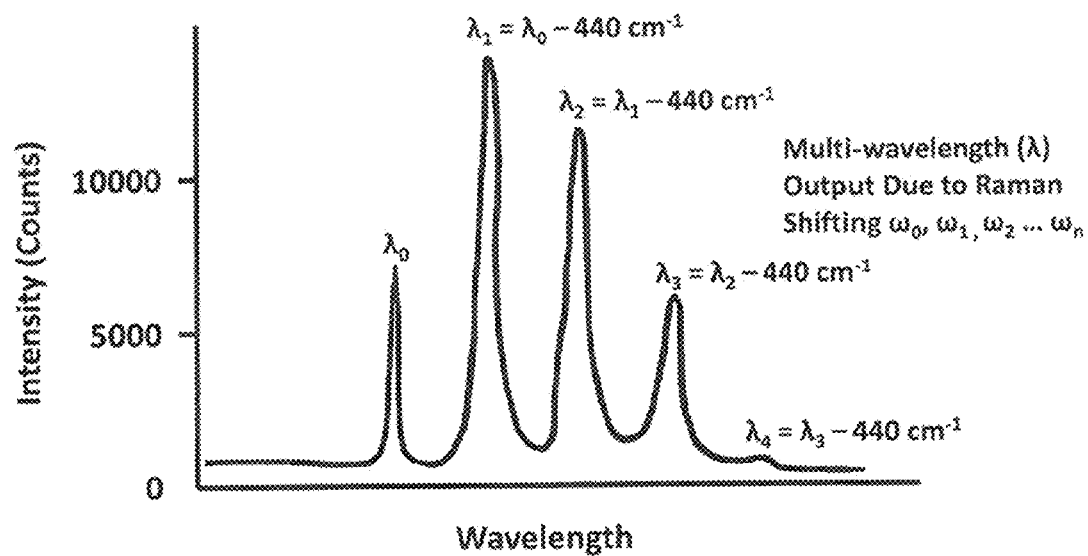
FIG. 4 is a graph showing the spectral output from a standard multimode optical fiber.

The process that occurs in such a standard multimode optical fiber 10 is known as Stimulated Raman Scattering (SRS) and is a well-known nonlinear process in optical fibers. The pump laser beam at wavelength $\lambda_0$ interacts with a Raman medium (optical fiber 10) to generate Raman-shifted radiation at additional wavelengths of $\lambda_1$, $\lambda_2$, $\lambda_3$ and $\lambda_4$ as shown in FIG. 4.

Very briefly, the scattering of light may be thought of as the redirection of light that takes place when an electromagnetic wave (from pulsed laser 11) encounters an obstacle of non-homogeneity (coiled optical fiber 10). As the electromagnetic wave interacts with the matter, the electron orbits within the constituent molecules are perturbed periodically with the same frequency as the electric field of the incident wave. The majority of light scattered is emitted at the identical frequency of the incident laser light, a process referred to as elastic scattering. However, additional light is scattered at different frequencies, a process referred to as inelastic scattering. Raman scattering is one such example of inelastic scattering and produces light at multiple frequencies that are at both shorter and longer wavelengths than the wavelength of the incident wavelength of $\lambda_0$ from laser 11. In the present invention the extra wavelengths generated ($\lambda_1$, $\lambda_2$, $\lambda_3$ and $\lambda_4$) by the Raman scattering are all longer than the incident wavelength $\lambda_0$.

In an alternative embodiment of the invention pulsed laser 11 may be a single laser or may be multiple lasers generating output light pulses at more than one wavelength to drive compressed fiber coil 10 at the same time. More particularly, laser(s) generating two or more wavelengths can be launched into a multimode fiber 10 in the form of a compressed coil per the invention. The presence of multiple initial wavelengths input to fiber 10 allows for even greater spectral coverage output compared to a single wavelength from laser pump 11. These multiple wavelengths will all Raman shift differently, allowing for a larger spectral coverage having more peaks. In addition, the compressed fiber coil 10 can allow for the initial input wavelengths to mix, providing a greater amount of nonlinear mixing in fiber coil 10 for greatly enhanced spectral coverage compared to a single wavelength laser pump 11.

With the present invention optical fiber 10 is preferably made of silica but may also be made of silicate, germinate, phosphate, fluoride, chalcogenide, or telluride. In silica optical fibers, the wavelength of each Raman shift wavelength is 440 $cm^{-1}$ shorter than its pump signal which is the previous longer wavelength as shown in FIG. 4. Thus, as shown in FIG. 4, $\lambda_1 = \lambda_0 - 440\ cm^{-1}$, $\lambda_2 = \lambda_1 - 440\ cm^{-1}$, $\lambda_3 = \lambda_2 - 440\ cm^{-1}$, and $\lambda_4 = \lambda_3 - 440\ cm^{-1}$. That is the Raman shift spectrum.

Figure 5:
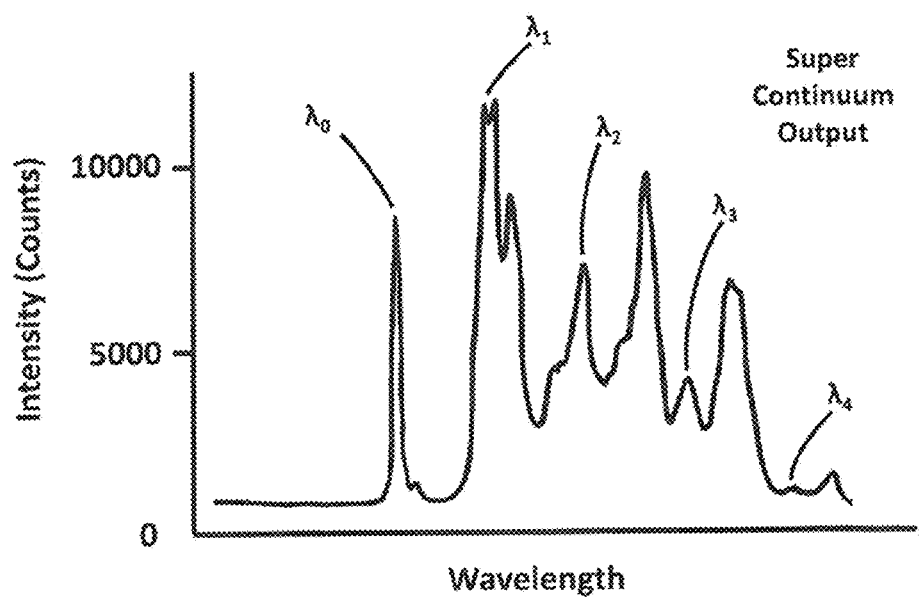
FIG. 5 is a graph showing the spectral output from a standard multimode optical fiber the windings of which are compressed against each other to create a supercontinuum generator.

There are a host of other nonlinear effects in optical fibers, including: Four-Wave Mixing (FWM), Stimulated Brillouin Scattering (SBS), Self-Phase Modulation (SPM), and Cross-Phase Modulation (XPM). The thresholds for these nonlinearities are dependent on fiber composition, fiber length, fiber core diameter, and the amount of optical power contained within the fiber waveguide. In optical fibers, these nonlinearities may interact to generate broadband output known as supercontinuum generation. The additional wavelength outputs so produced make up the supercontinuum are shown in FIG. 5 and are interspersed with the Raman scattering outputs $\lambda_0$, $\lambda_1$, $\lambda_2$, $\lambda_3$ and $\lambda_4$.

In the preferred embodiment of the invention the multimode optical fiber that is utilized is not a special non-linear fiber so does not have the problems described in the Background of the Invention for special, small core diameter optical fibers. The result is reduced cost and less complexity in coupling a laser output into one end of a standard optical fiber and maintaining it there. In addition, the standard optical fibers utilized with the invention are both inexpensive and robust.

In the preferred embodiment of the invention standard, large core optical fibers are utilized which have a core that is larger than 5 microns in diameter. These optical fibers may be single mode or multimode, but multimode optical fibers are preferred and are described herein. The advantage of using a multimode large core optical fiber is that it is easier to free-space couple a laser there into and to maintain the optical coupling over vibrations and large temperature variations.

Figure 2:
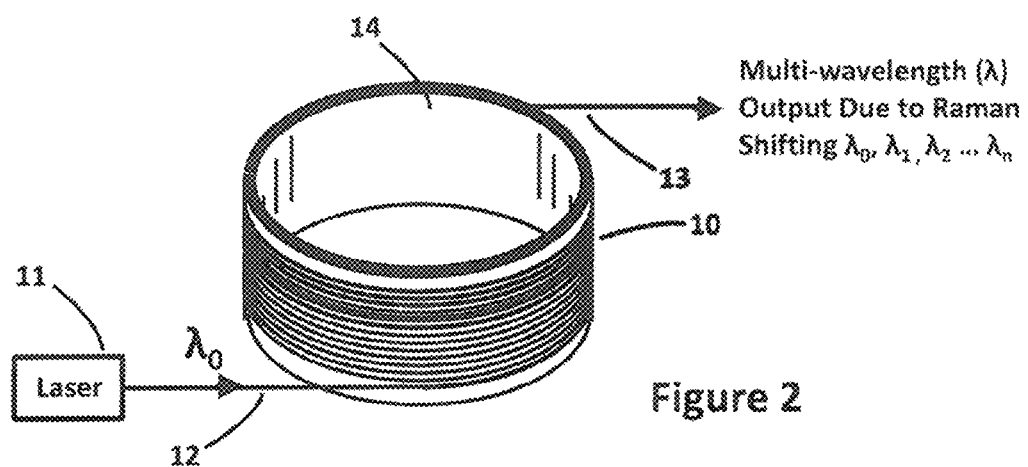
FIG. 2 shows a standard multimode optical fiber wound on a typical fiber spool.

In the preferred embodiment of the invention described herein optical fiber 10 has a core diameter of 15 microns and is 250 meters long. The length of the optical fiber depends on the amount of power from laser 11 that is launched into optical fiber 10, as well as the spectral coverage desired. The longer is optical fiber 10 the broader is its spectral coverage. In the preferred embodiment of the invention the 250 meters of optical fiber is wound on a typical fiber spool 14 that is shown in FIG. 2. The size (height) of fiber spool 14 and the spacing between windings of optical fiber 10 are shown exaggerated in FIG. 2 to better understand the orientation and relationship between the elements.

Figure 3:
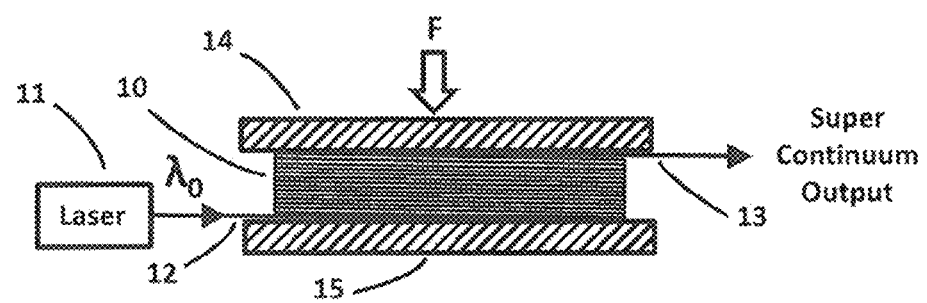
FIG. 3 shows a standard multimode optical fiber wound on a typical fiber spool and the windings are compressed against each other to create a supercontinuum generator.

FIG. 3 shows coiled optical fiber 10 between two plates 14 and 15 and the coil is being compressed by a force "F" in accordance with the teaching of the present invention. Otherwise, the laser 11 and coiled optical fiber 10 are the same as previously described. To do this optical fiber 10 is removed from its fiber spool shown in FIG. 2, is placed on a plate 15 and compressed by plate 14 with force "F". Due to the compression interactions between the windings of coiled optical fiber 10 modal mixing and birefringence is induced in optical fiber 10. The birefringence is added due to fiber overlap, stress due to compression of the optical fiber, and modal mixing in the optical fiber 10. This allows for better "mixing" of the spatial beam in the multimode optical fiber 10 and allows for the various modes to overlap in optical fiber 10 and over a longer path length due to the angle the original laser beam at $\lambda_0$ and Stokes wavelengths at $\lambda_1$, $\lambda_2$, $\lambda_3$ and $\lambda_4$ travel in coiled fiber 10. As shown in FIG. 3 there some artistic liberties taken. A small amount of space is shown between the windings of optical fiber 10 which is not really there. The amount of force "F" will affect the amount of birefringence induced in optical fiber 10 and the degree of the additional non-linear processes (FWM, XPM, SPM) that are excited and occur in compressed fiber coil 10.

By compressing the coil of optical fiber 10, as shown in FIG. 3, the previously mentioned additional nonlinear processes (FWM, XPM, SPM, etc.), and possibly others, are excited and occur in compressed fiber coil 10 (FIG. 3), so more broadband light is generated. This is in contrast to standardly spooled fiber (FIGS. 1 and 2) where only Raman shifting occurs as shown in FIG. 4.

As described above the compression allows for more spectral output from optical fiber 10 using the same input laser 11 by only changing the mechanical forces on fiber 10. The invention does not require special fiber, nonlinear fiber, photonic crystal fiber, or even single-mode fiber. The invention also does not require modulation instability in the fiber to generate supercontinuum light, nor does it require a large amount of peak pulsed power from the pump laser 11. A standard multimode fiber 10 is utilized to generate broadband output, with spectral coverage defined by the fundamental Raman shifting in fiber 10. Multimode optical fibers are known in the art and have a high index of refraction core surrounded by an outer layer or cladding of a light transmitting material having a low index of refraction. The large diameter fiber core allows for easy and stable, free-space coupling of laser light into fiber 10 at input end 12, and the compressed coil of optical fiber 10 allows for the generation of a broadband output as shown in FIG. 5. The broadband supercontinuum output shown in FIG. 5 obviously goes beyond the Raman scattering outputs $\lambda_0$, $\lambda_1$, $\lambda_2$, $\lambda_3$ and $\lambda_4$ shown in FIG. 4 and repeated in FIG. 5. While a specific number of multimodes are shown and described herein, an optical fiber cable having any number of multimodes may be utilized while practicing the invention. It has been experienced that larger core optical fibers having more than five modes promote more spectral coverage in the fiber and better fill in gaps between the Raman scattering peaks.

In FIG. 4 is a graph showing the multi-wavelength outputs $\lambda_0$, $\lambda_1$, $\lambda_2$, $\lambda_3$ and $\lambda_4$ from coiled, multimode, optical fiber 10 shown in FIG. 2 due only to the Raman scattering, before the invention is implemented. More particularly, the multimode (five) outputs are $\lambda_0$, which is the wavelength of the laser beam output from laser 11 that is pumping optical fiber 19 on fiber spool 14, $\lambda_1 = \lambda_0 - 440\ cm^{-1}$, $\lambda_2 = \lambda_1 - 440\ cm^{-1}$, $\lambda_3 = \lambda_2 - 440\ cm^{-1}$, and $\lambda_4 = \lambda_3 - 440\ cm^{-1}$. The laser beam from laser 11 at wavelength $\lambda_0$ and input to end 12 of coiled optical fiber 10 may be continuous wave or pulsed. Some of the energy that is originally in the pump laser beam at wavelength $\lambda_0$ is transferred to the other wavelength outputs $\lambda_1, \lambda_2, \lambda_3$ and $\lambda_4$. These additional wavelengths are known as Stokes wavelengths. This process continues to cascade throughout the length of optical fiber 10. The disadvantage of the Raman approach is that there are gaps between the wavelength shifts as seen in FIG. 4. For some applications, these gaps are undesirable since portions of the spectrum are missing.

In FIG. 5 is a graph showing the multi-wavelength outputs $\lambda_0, \lambda_1, \lambda_2, \lambda_3$ and $\lambda_4$ from the coiled, multimode, optical fiber 10 shown in FIG. 2 due only to the Raman scattering, overlaid with the additional wavelengths generated by the additional processes enabled in fiber 10 by the mechanical compression thereof. As previously described, the broadband supercontinuum output shown by other peaks in FIG. 5 obviously go beyond the Raman scattering outputs λ0, λ1, λ2, λ3 and λ4 shown in FIG. 4 and repeated in FIG. 5.

The novelty is that the present invention does not require special fiber, nonlinear fiber, photonic crystal fiber, or even single-mode fiber. The invention also does not require modulation instability in the fiber to generate supercontinuum light, nor does it require a large amount of peak pulsed power from the pump laser. A standard multimode fiber may be utilized to generate broadband output, with spectral coverage defined by the fundamental Raman shifting in the fiber. The relatively large diameter core of the fiber allows for easy and stable free-space coupling of light, and the compressed coil enables other processes that generate additional wavelengths for the supercontinuum. In addition, the intensity of the output spectra is well distributed in comparison to typical supercontinuum sources, with higher optical intensities occurring at longer wavelengths than the fundamental. In typical supercontinuum sources, the fundamental pump has the highest intensity in the fiber, and the supercontinuum is generally surrounding that pump signal with significantly less intensity.

Further, due to the utilization of the teaching of the invention, the intensity of the supercontinuum output spectra shown in FIG. 5 is well distributed and is mixed with the typical Raman spectrum shown in FIG. 4, with higher optical intensities occurring at wavelengths longer than the fundamental wavelength. In typical, prior art supercontinuum sources, the fundamental wavelength of the pump at $\lambda_0$ has the highest intensity in the fiber, and the supercontinuum generally surrounds the fundamental pump signal with significantly less intensity. As seen in FIG. 5, with the utilization of the invention the gaps between the Raman shifts wavelengths are filled in, showing a more broadband spectral output. In addition, wavelengths longer than the initial Raman shifts are present in the output shown in FIG. 5, allowing for enhanced spectral coverage. Stated another way, new modes (wavelengths) are generated which are interspersed with the prior art Raman wavelength modes shown in FIG. 4. The final result is the more broadband spectral output shown in FIG. 5.

Some optical fibers that may be utilized with the present invention are photonic crystal fibers and air holes are placed in the optical fiber itself to engineer the dispersion and propagation characteristics of the fiber. Although such photonic crystal fibers offer high nonlinearity, they have drawbacks. It is very difficult to splice to them and the air holes must remain clean and free from debris to maintain its optical properties.

In alternative embodiments of the invention single mode fibers or large effective mode area (LMA) fibers may be utilized to allow for easy free-space coupling of a laser beam. LMA optical fibers are those having relatively large mode areas and a single transverse mode or only a few modes. Due to the reduced optical intensities, such LMA fibers effectively have lower nonlinearities and a higher damage threshold, which makes them suitable for, e.g., the amplification of intense pulses or single-frequency signals in fiber amplifiers. Standard single-mode fibers have an effective mode area below 100 $\mu m^2$, and large mode area (LMA) fibers reach values of hundreds or even thousands of $\mu m^2$.

A straightforward design approach to obtain large mode areas is to decrease the numerical aperture (NA), i.e., to decrease the refractive index difference between the core and the cladding, for a step-index fiber design. The numerical aperture (NA) is also called an acceptance angle and measures the range of acceptance of light into an optical fiber. If fiber coil is coiled too tightly (too small a diameter) higher order modes in the fiber are lost.

The best optical fiber designs reach an effective mode area of several thousand $\mu m^2$. This is not a strict limit, but designs with larger mode areas exhibit less robust single-mode propagation and often can tolerate only very slight bending. It appears that no kind of design can offer a further substantial expansion of the mode area with robust single-mode propagation. The reason for this is essentially that a mode involves some balance of diffraction and waveguiding, and as diffraction inevitably becomes weaker at larger mode areas, this balance becomes more and more sensitive to any disturbances.

While what has been described herein is s preferred embodiment of the invention those skilled in the art will realize that numerous changes may be made without departing from the spirit and scope of the invention.

The invention claimed is:
1. An optical fiber coil for creating a broadband spectral output when driven by a laser, the optical fiber coil for creating a broadband spectral output comprising;

a standard optical fiber coiled to form a coil that has an axis about which the coil is formed, the standard optical fiber consisting only of a high index of refraction core surrounded by only one outer layer or cladding that is a light transmitting material having a low index of refraction and the optical fiber is end pumped rather than cladding pumped; and means for mechanically compressing the coiled optical fiber in a direction parallel to the axis of the coiled fiber;

wherein compressing the coiled fiber induces modal mixing and birefringence in the fiber for to produce the broadband spectral output.

2. The optical fiber coil for creating broadband spectral output of claim 1 further comprising two plates and wherein the coiled fiber is between the two plates and mechanical compression of the coiled fiber is created by a force applied to the two plates and this causes additional non-linear processes to be excited in the fiber coil to generate more broadband light.

3. The optical fiber coil for creating broadband spectral output of claim 2 wherein the multi-mode fiber is selected from the group consisting of silica, silicate, germinate, phosphate, fluoride, chalcogenide and telluride.

4. The optical fiber coil for creating broadband spectral output of claim 3 wherein the optical fiber is a multimode fiber that has at least two modes in operation.

5. The optical fiber coil for creating broadband spectral output of claim 4 further comprising a laser generating output light of at least one wavelength that is input to one end of the multimode fiber.

6. The optical fiber coil for creating broadband spectral output of claim 1 wherein the multi-mode fiber is selected from the group consisting of silica, silicate, germinate, phosphate, fluoride, chalcogenide and telluride.

7. The optical fiber coil for creating broadband spectral output of claim 1 wherein the optical fiber is a multimode fiber that has at least two modes in operation.

8. The optical fiber coil for creating broadband spectral output of claim 1 further comprising a laser generating output light of at least one wavelength that is input to one end of the multimode fiber.

9. An optical fiber coil for creating a broadband spectral output when driven by a laser, the optical fiber coil comprising:

a standard optical fiber coiled to form a coil that has an axis about which the coil is formed, the standard optical fiber consisting only of a high index of refraction core surrounded by only one outer layer or cladding that is a light transmitting material having a low index of refraction and the optical fiber is end pumped rather than cladding pumped; and means for mechanically compressing the coiled fiber between two plates in a direction parallel to the axis of the coiled fiber;

wherein the mechanical compression of the coiled fiber causes additional non-linear processes to be excited in the fiber coil to generate more broadband light.

10. The optical fiber coil for creating broadband spectral output of claim 9 wherein the optical fiber is a multimode fiber that has at least two modes in operation.

11. The optical fiber coil for creating broadband spectral output of claim 9 wherein the multi-mode fiber is selected from the group consisting of silica, silicate, germinate, phosphate, fluoride, chalcogenide and telluride.

12. The optical fiber coil for creating broadband spectral output of claim 9 further comprising a laser generating output light of at least one wavelength that is input to one end of the multimode fiber.

13. A method for generating a broadband output from a coiled optical fiber that consists only of a high index of refraction core surrounded by only one outer layer or cladding that is a light transmitting material having a low index of refraction and the optical fiber is end pumped rather than cladding pumped, wherein the coiled fiber has an axis, and comprising the step of:

compressing the coiled optical fiber between two plates in a direction parallel to the axis of the coiled fiber;

wherein compressing the coiled fiber induces modal mixing and birefringence in the fiber.

14. The method for generating a broadband output from a coiled optical fiber of claim 13 wherein the mechanical compression of the coiled fiber causes additional non-linear processes to be excited in the fiber coil to generate more broadband light.

15. The method for generating a broadband output from a coiled optical fiber of claim 14 wherein the multi-mode fiber is selected from the group consisting of silica, silicate, germinate; phosphate, fluoride, chalcogenide and telluride.

16. The method for generating a broadband output from a coiled optical fiber of claim 13 wherein the optical fiber is a multimode fiber that has at least two modes in operation.

17. The method for generating a broadband output from a coiled optical fiber of claim 13 wherein the multi-mode fiber is selected from the group consisting of silica, silicate, germinate, phosphate, fluoride, chalcogenide and telluride.

18. The method for generating a broadband output from a coiled optical fiber of claim 13 further comprising the step of driving the coiled optical fiber with a laser generating output light of at least one wavelength that is input to one end of the multimode fiber.

19. The method for generating a broadband output from a coiled optical fiber of claim 18 wherein the optical fiber is a multimode fiber that has at least two modes in operation.

20. The method for generating a broadband output from a coiled optical fiber of claim 19 further comprising the step of driving the coiled optical fiber with a laser generating output light of at least one wavelength that is input to one end of the multimode fiber.

\* \* \* \* \*